(12) United States Patent
Matsuo et al.

(10) Patent No.: US 11,917,008 B2
(45) Date of Patent: Feb. 27, 2024

(54) RELAY SERVER, RELAY METHOD, AND RELAY PROGRAM

(71) Applicant: Nippon Telegraph and Telephone Corporation, Tokyo (JP)

(72) Inventors: Kazuya Matsuo, Musashino (JP); Masaru Takagi, Musashino (JP); Ryota Nakada, Musashino (JP); Koya Mori, Musashino (JP); Hiroyuki Tanaka, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 5 days.

(21) Appl. No.: 17/629,837

(22) PCT Filed: Jul. 29, 2019

(86) PCT No.: PCT/JP2019/029694
§ 371 (c)(1),
(2) Date: Jan. 25, 2022

(87) PCT Pub. No.: WO2021/019653
PCT Pub. Date: Feb. 4, 2021

(65) Prior Publication Data
US 2022/0263899 A1   Aug. 18, 2022

(51) Int. Cl.
*G06F 15/16*   (2006.01)
*H04L 67/12*   (2022.01)
*H04L 67/2869*   (2022.01)
*H04L 47/10*   (2022.01)

(52) U.S. Cl.
CPC .............. *H04L 67/12* (2013.01); *H04L 47/10* (2013.01); *H04L 67/2869* (2022.05)

(58) Field of Classification Search
CPC ...... H04L 67/12; H04L 67/2869; H04L 47/10
See application file for complete search history.

(56) References Cited

U.S. PATENT DOCUMENTS

2011/0310247 A1* 12/2011 Rensin .................. H04L 67/148
709/219
2015/0006446 A1*  1/2015 Chiba ..................... G01P 13/00
702/187
(Continued)

FOREIGN PATENT DOCUMENTS

JP   2008310721   12/2008
JP   2018092472    6/2018
(Continued)

OTHER PUBLICATIONS

[No Author Listed] [online], "Draco 3d Data Compression," available on or before Jun. 14, 2018, retrieved on Jun. 24, 2019, retrieved from URL <https://google.github.io/draco/>, 3 pages.
[No Author Listed] [online], "Gartner Identifies the Top 10 Strategic Technology Trends for 2018," retrieved on Jun. 24, 2019, retrieved from URL <https://www.gartner.com/jp/newsroom/press-releases/pr-20171026>, 17 pages (with English Translation).
(Continued)

*Primary Examiner* — Normin Abedin
(74) *Attorney, Agent, or Firm* — Fish & Richardson P.C.

(57) ABSTRACT

Provided is a relay server capable of reducing network traffic when collecting large amounts of sensor data from a large number of sensor terminals. A relay server that collects sensor data from a plurality of sensor terminals and uploads the sensor data to a central server via a network includes a data collection unit that collects the sensor data from the plurality of sensor terminals, a relay data creation unit that calculates a presence of spatial overlaps between the collected sensor data, removes overlaps between the sensor data, and creates relay data integrating the sensor data, and an upload unit that uploads the relay data to the central server.

6 Claims, 6 Drawing Sheets

(56) References Cited

U.S. PATENT DOCUMENTS

2017/0207926 A1\* 7/2017 Gil .................. H04L 12/282
2018/0160299 A1   6/2018 Onishi et al.
2019/0228647 A1   7/2019 Conde et al.
2020/0150234 A1\* 5/2020 Miki .................. G08G 1/16

FOREIGN PATENT DOCUMENTS

JP       2018116014      7/2018
WO   WO 2019/131075    7/2019

OTHER PUBLICATIONS

[No Author Listed] [online], "GitHub—microsoft/Mixed Reality Toolkit at c562ff9582cd10ea0448fd846f7b2bb26le8f551," retrieved on Jun. 24, 2019, retrieved from URL <https://github.com/Microsoft/MixedRealityToolkit/tree/c562ff9582cd10ea0448fd846f7b2bb261e8f551>, 3 pages.

[No Author Listed] [online], "Microsoft HoloLens Mixed Reality Technology Supporting Business," available on or before Apr. 13, 2017, retrieved on Jun. 24, 2019, retrieved from URL <https://www.microsoft.com/ja-jp/HoloLens>, 8 pages (with English Translation).

[No Author Listed] [online], "PyMesh—Geometry Processing Library for Python—PyMesh 0.2.1 documentation," available on or before Jun. 4, 2016, retrieved on Jun. 24, 2019, retrieved from URL <https://pymesh.readthedocs.io/en/latest/index.html>, 3 pages.

Saddik, "Digital twins: the convergence of multimedia technologies," IEEE MultiMedia, 2018, 25(2):87-92.

\* cited by examiner

RELAY SERVER, RELAY METHOD, AND RELAY PROGRAM

CROSS-REFERENCE TO RELATED APPLICATIONS

This application is a National Stage application under 35 U.S.C. § 371 of International Application No. PCT/JP2019/029694, having an International Filing Date of Jul. 29, 2019. The disclosure of the prior application is considered part of the disclosure of this application, and is incorporated in its entirety into this application.

FIELD

An aspect of the present invention relates to a relay server, a relay method, and a relay program.

BACKGROUND

Due to the rise of Internet of Things (IoT) technology, data collection utilizing various types of sensors and analysis of the collected data are progressing in a variety of fields, such as the manufacturing industry, automotive industry (automated driving assistance), and agricultural industry. With IoT, data generated from devices such as sensors connected to a network (also referred to as "sensor terminals", "sensing devices", or "terminals that can transmit data") is collected on a cloud and utilized for various applications.

Sensor terminals come in many different types, and there is a vast number of them. In addition, the sensor terminals generate a wide variety of data, which is used for many different types of applications.

For example, data (sensor data) measuring the state of an environment or object, such as temperature and humidity, is extremely effective for visualizing the state thereof, or for detecting an anomaly. In recent years, with advancements in data analysis technology, the environment of an observation target can be visually and three-dimensionally ascertained using not only one-dimensional numerical data as mentioned above, but also two-dimensional data such as image data and three-dimensional data which is an aggregate of detection points in three dimensions, which enables a more detailed understanding of the state of the observation target. Known sensor terminals for three-dimensional data include, for example, Mixed Reality (MR) terminals such as HoloLens (see, for example, Non-Patent Literature 1), Light Detection and Ranging (LiDAR) sensors, etc. Against this background, digital twin technology (see, for example, Non-Patent Literature 2), which collects various sensor data from sensor terminals installed all over the world and replicates a real space in real time in a digital space based on that data, is attracting attention. The realization of digital twins is said to enable more advanced prediction, management, and analysis of various events in the real world (see, for example, Non-Patent Literature 3).

On the other hand, in order to realize a digital twin, data where each data piece is of a large size, such as images and 3D data, must be collected in large amounts and in a continuous manner from a plurality of sensor terminals. This increases network traffic, which puts a great load on the network. Solving this problem will require a configuration that reduces traffic flowing through the network.

A technique for solving the aforementioned problem is data compression. Typical methods include zip as a general-purpose compression method, JPEG compression and PNG compression for image data, and Draco (see, for example, Non-Patent Literature 4) for three-dimensional data such as CAD data and LiDAR data. For example, in a case of collecting three-dimensional data acquired from LiDAR sensors installed in connected cars onto a central server, each vehicle is provided with a data compression functional unit, and the central server is provided with a data decompression functional unit that decompresses the compressed data. If compression is performed by the data compression functional unit of the vehicle using a three-dimensional data compression method such as Draco to reduce the size of the three-dimensional data to 30% of its original size, traffic during collection can be reduced by 70% compared to a case in which collection is done without compression.

CITATION LIST

Non-Patent Literature

[Non-Patent Literature 1] "Microsoft HoloLens Mixed Reality Technology Supporting Business" [Online], [Retrieved on Jun. 24, 2019], Internet <URL: https://www.microsoft.com/ja-jp/HoloLens>

[Non-Patent Literature 2] El Saddik, Abdulmotalebm, "Digital twins: the convergence of multimedia technologies", IEEE MultiMedia, 25(2), pp. 87-92, 2018.

[Non-Patent Literature 3] "Gartner, Identifies the Top 10 Strategic Technology Trends for 2018" [Online], [Retrieved on Jun. 24, 2019], Internet <URL: https://www.gartner.com/jp/newsroom/press-releases/pr-20171026>

[Non-Patent Literature 4] "DRACO 3D DATA COMPRESSION", [Online], [Retrieved on Jun. 24, 2019], Internet <URL: https://google.github.io/draco/>

SUMMARY

Technical Problem

The data compression techniques described above can reduce the size of individual data files to reduce traffic during collection. However, these conventional techniques for compressing individual data files do not account for redundancy among sensor data acquired by different sensor terminals. Therefore, when continuously collecting data from a large number of sensor terminals, it may in some cases be possible to further reduce traffic.

The present invention was made in view of the above circumstances, and has an object of providing a relay server, relay method, and relay program that allow for a reduction of network traffic when collecting large amounts of sensor data from a large number of sensor terminals.

Solution to Problem

In order to solve the above problem, a first aspect of the present invention is a relay server that collects sensor data from a plurality of sensor terminals and uploads the sensor data to a central server via a network, the relay server including: a data collection unit configured to collect the sensor data from the plurality of sensor terminals; a relay data creation unit configured to calculate a presence of spatial overlaps between the collected sensor data, remove overlaps between the sensor data, and create relay data integrating the sensor data; and an upload unit configured to upload the relay data to the central server.

A second aspect of the present invention is a relay server that collects sensor data from a plurality of sensor terminals and uploads the sensor data to a central server via a network, the relay server including: a processor; and a memory connected to the processor, the processor being configured to: collect the sensor data from the plurality of sensor terminals and store the sensor data in the memory; calculate a presence of spatial overlaps between the sensor data stored in the memory, remove overlaps between the sensor data, and create relay data integrating the sensor data; and upload the relay data to the central server.

A third aspect of the present invention is a relay method for a relay server that collects sensor data from a plurality of sensor terminals and uploads the sensor data to a central server via a network, the method including: collecting the sensor data from the plurality of sensor terminals; with respect to most temporally recent sensor data of the collected sensor data, calculating a range in which detection points included in the most temporally recent sensor data exist; determining detection points of the sensor data other than the most temporally recent sensor data included in the range as overlapping detection points; removing data of the overlapping detection points from the sensor data including the overlapping detection points; creating relay data by integrating the most temporally recent sensor data and the sensor data from which the overlapping detection points were removed; and uploading the relay data to the central server.

A fourth aspect of the present invention is a relay program being executed by a processor of a relay server that collects sensor data from a plurality of sensor terminals and uploads the sensor data to a central server via a network, the relay server including the processor and a storage, the program causing the processor to function as: a data collection unit configured to collect the sensor data from the plurality of sensor terminals and store the sensor data in the storage; a relay data creation unit configured to calculate a presence of spatial overlaps between the collected sensor data, remove overlaps between the sensor data, and create relay data integrating the sensor data; and an upload unit configured to upload the relay data to the central server.

Advantageous Effects of Invention

According to the aspects of the present invention, by relay serves at acquisition positions close to the sensor terminals, sensor data is collected, redundant data is removed, and sensor data is integrated and uploaded to the central server, which makes it possible to provide a relay server, a relay method, and a relay program that allow for reduction of network traffic when large amounts of sensor data is collected from a large number of sensor terminals.

DETAILED DESCRIPTION

An embodiment of the present invention is described below with reference to the drawings.

(Configuration)

(1) System

Figure 1:
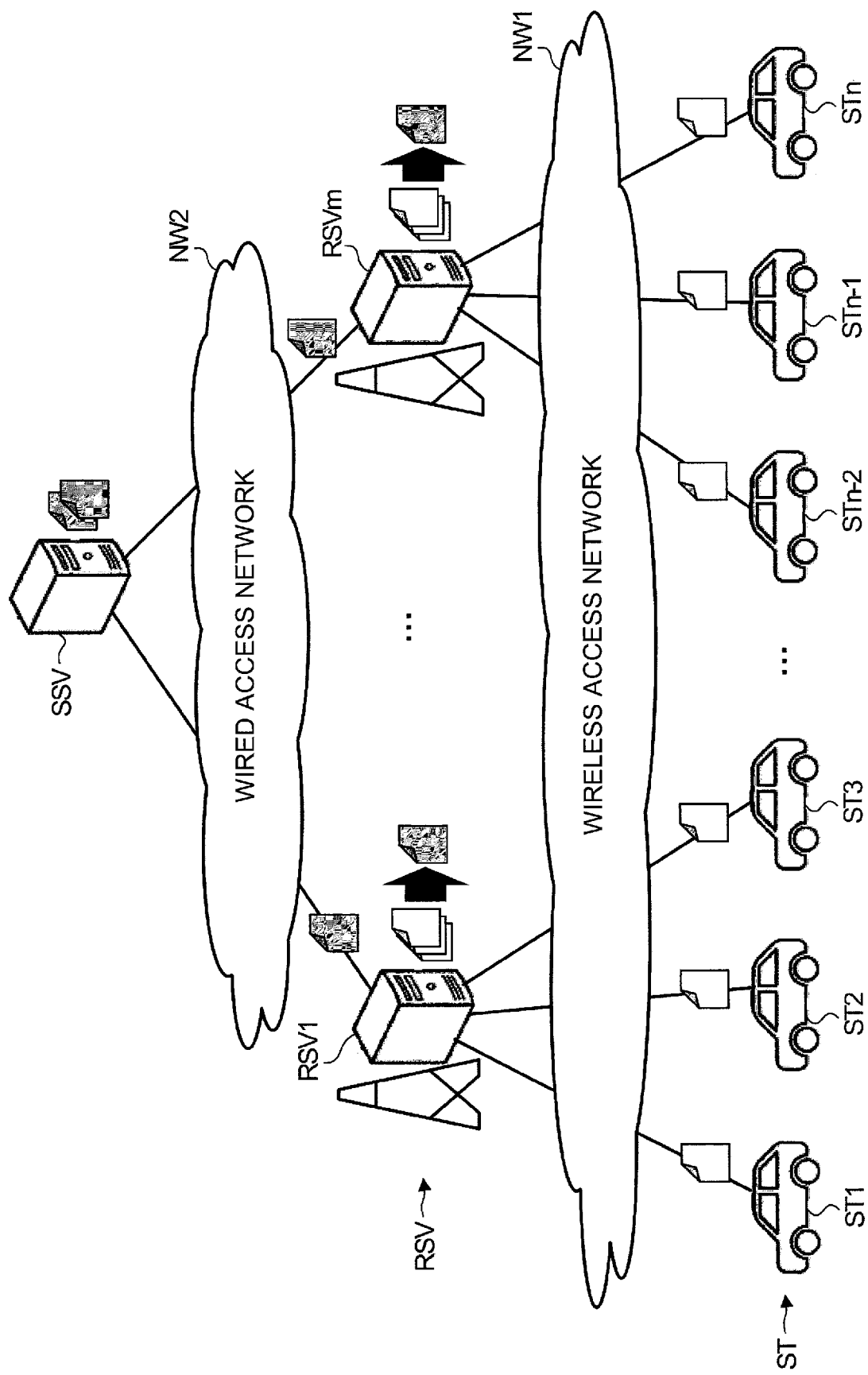
FIG. 1 shows an overall configuration of a data collection system according to one embodiment of the present invention.

FIG. 1 shows an overall configuration of a data collection system including a relay server according to one embodiment of the present invention. This system includes a plurality of sensor terminals ST1, ST2, ST3, . . . , STn (where n is an integer) (hereinafter also collectively referred to as "sensor terminals ST"), a plurality of relay servers RSV1, . . . , RSVm (where m is an integer) (hereinafter also collectively referred to as "relay servers RSV"), and a central server SSV. The sensor terminals ST and the relay servers RSV are communicable with each other via, for example, a wireless access network NW1, and the relay servers RSV and the central server SSV are communicable with each other via, for example, a wired access network NW2.

The sensor terminals ST are terminals that can transmit sensor data to the relay servers RSV via the wireless access network NW1. The sensor terminals ST are, for example, a plurality of IoT-related devices with multiple sensor functions, and may be mobile terminals collecting various kinds of three-dimensional data in any field, such as manufacturing, automotive (automated driving), agricultural, medical, healthcare, distribution, finance, etc. The sensor terminals ST may include, for example, MR terminals such as HoloLens, LiDAR sensor, etc. FIG. 1 exemplarily shows, as the sensor terminals ST, LiDAR sensors installed in vehicles known as connected cars.

Used as the wireless access network NW1 is a wireless communication network such as a wireless local area network (LAN) or a mobile phone network operating under a standard such as, for example, 3G, 4G, or 5G.

The relay servers RSV are servers (edge servers) installed at a wireless base station and including, for example, server computers or personal computers, etc., and are devices capable of receiving sensor data from the plurality of sensor terminals ST via the wireless access network NW1. In addition, these relay servers RSV are capable of transmitting, that is to say uploading sensor data to the central server SSV via the wired access network NW2. The relay servers RSV have the functionality of receiving sensor data collected by the sensor terminals ST and relaying the sensor data to the central server SSV. In the present embodiment, the relay servers RSV receive three-dimensional sensor data transmitted from the plurality of sensor terminals ST, removes overlaps and integrates the sensor data, and then uses a three-dimensional data compression method such as Draco or the like, allowing for a reduction of the amount of sensor data to be transmitted to the central server SSV.

The wired access network NW2 may be, for example, a wired communication network using optical fiber. The wired access network NW2 may further be connected to the central server SSV via a wired core network not shown here.

The central server SSV is an application server or a database server (including, for example, a server operated on the web by a service provider) or the like, which performs a specific process based on the data collected by the sensor terminals ST.

(2) Relay Server
(2-1) Hardware Configuration

Figure 2:
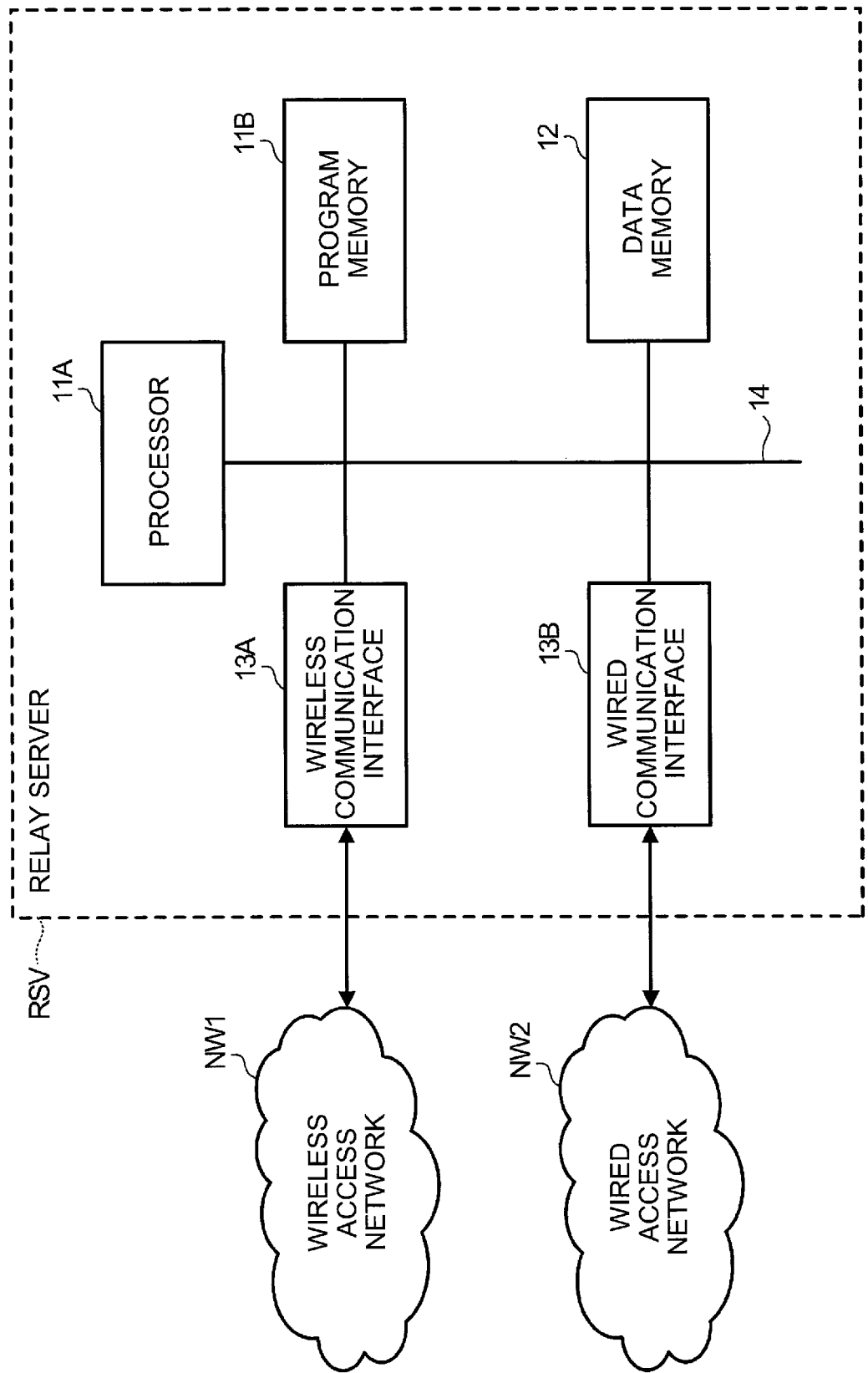
FIG. 2 is a block diagram showing a hardware configuration of a relay server according to one embodiment of the present invention.

FIG. 2 is a block diagram showing an example hardware configuration of the relay server RSV shown in FIG. 1. The relay server RSV includes, for example, a server computer or a personal computer, etc., and has a hardware processor 11A such as, for example, a central processing unit (CPU). A program memory 11B, a data memory 12, a wireless communication interface 13A, and a wired communication interface 13B are connected to this hardware processor 11A via a bus 14.

The program memory 11B uses, as a storage medium, a combination of a non-volatile memory that is writable and readable at any time, such as, for example, a Hard Disk Drive (HDD) or Solid-State Drive (SSD), and a non-volatile memory such as a Read-Only Memory (ROM), and stores programs necessary for executing various processes.

The data memory 12 uses, as a storage medium, a combination of a non-volatile memory that is writable and readable at any time, such as, for example, an HDD or SSD, and a volatile memory such as a Random-Access Memory (RAM), and is used to store data that is acquired and generated in the course of executing various processes.

The wireless communication interface 13A allows for transmission and reception of data to and from the sensor terminals ST via the wireless access network NW1. The protocol defined by the wireless access network NW1 is used as the communication protocol. An interface employing a low-power wireless data communication standard such as, for example wireless LAN or Bluetooth® is used as the wireless communication interface 13A.

The wired communication interface 13B allows for transmission and reception of data to and from the central server SSV via the wired access network NW2. The protocol defined by the wired access network NW2 is used as the communication protocol. For example, a wired LAN is used as the wired communication interface 13B.

(2-2) Software Configuration

Figure 3:
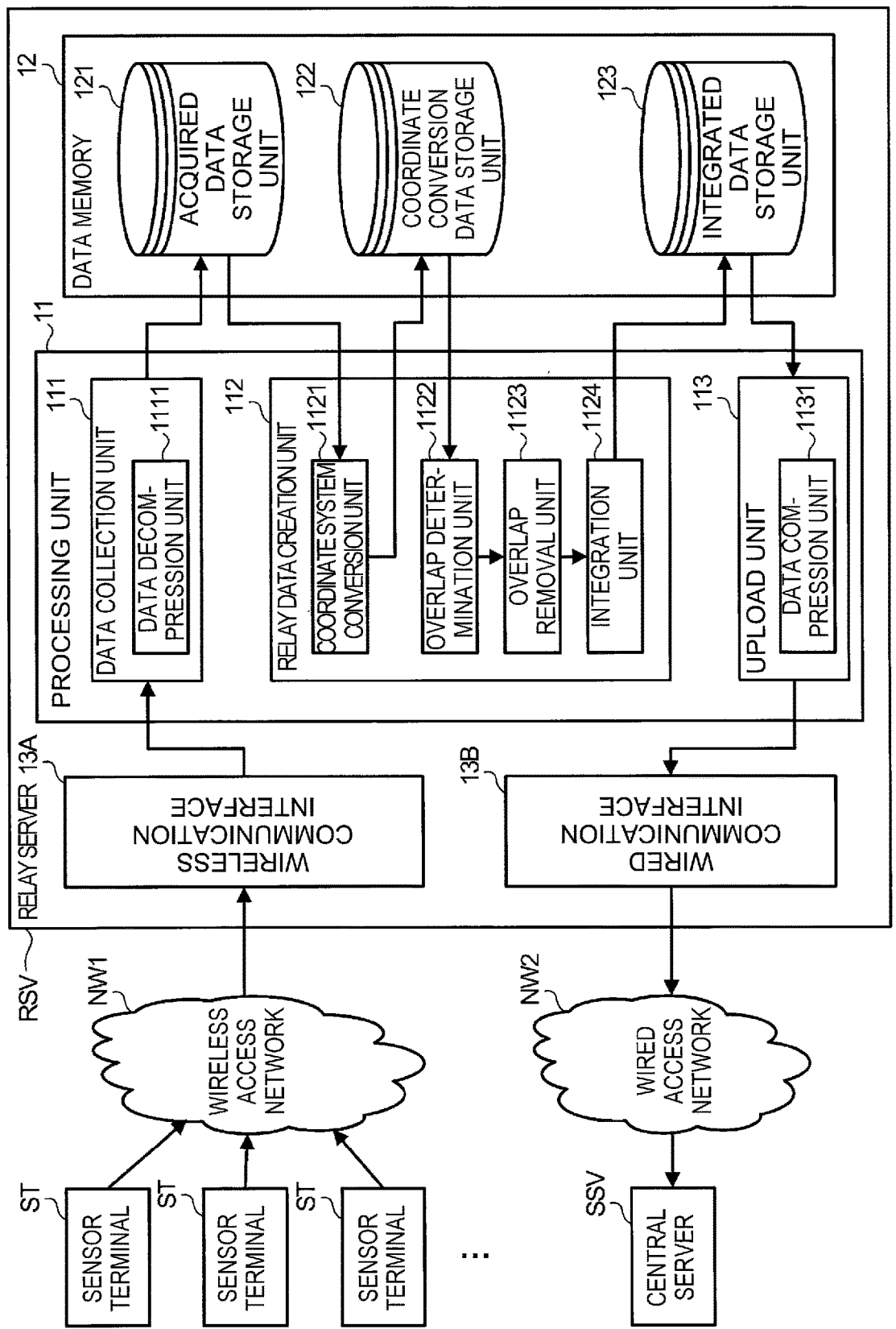
FIG. 3 is a block diagram showing a software configuration of the relay server according to one embodiment of the present invention.

FIG. 3 is a block diagram showing a software configuration of the relay server RSV shown in FIG. 1 in association with the hardware configuration shown in FIG. 2.

As mentioned above, the relay server RSV is respectively communicable with the sensor terminals ST1 to STn via the wireless access network NW1 and with the central server SSV via the wired access network NW2. As mentioned above, the sensor terminals ST may include a diverse variety of devices.

The storage area of the data memory 12 includes an acquired data storage unit 121, a coordinate conversion data storage unit 122, and an integrated data storage unit 123.

The acquired data storage unit 121 is used to store sensor data acquired from each sensor terminal ST together with a device ID, date-and-time information, etc.

The coordinate conversion data storage unit 122 is used to store sensor data which is converted from respective sensor data stored in the acquired data storage unit 121 into data of the same coordinate system.

The integrated data storage unit 123 is used to store sensor data in which overlaps between sensor data are removed and the sensor data is integrated.

A processing unit 11 is constituted by the hardware processor 11A and the program memory 11B, and includes as software processing functional units a data collection unit 111, a relay data creation unit 112, and an upload unit 113. Each of these processing functional units is realized by causing the hardware processor 11A to execute programs stored in the program memory 11B. The processing unit 11 may also be realized in a variety of other forms including integrated circuits, such as an Application-Specific Integrated Circuit (ASIC) or a field-programmable gate array (FPGA).

The data collection unit 111 executes processes of acquiring sensor data transmitted from each sensor terminal ST via the wireless communication interface 13A, and storing the sensor data in the acquired data storage unit 121. Each sensor terminal ST has a data compression functional unit, and can perform compression using a three-dimensional data compression method such as Draco or the like to transmit three-dimensional data with its size reduced to, for example, 30% of its original size. The data collection unit 111 may include a data decompression unit 1111 that decompresses the compressed data to the original three-dimensional data. The information transmitted from each sensor terminal ST may include, in addition to three-dimensional data, for example, a device ID, the type of data generated by the device, the data format, the transmission frequency of the data, etc.

The relay data creation unit 112 executes processes of removing overlaps between the sensor data stored in the acquired data storage unit 121 and integrating the sensor data, thereby creating relay data to be transmitted to the central server SSV. This relay data creation unit 112 includes a coordinate system conversion unit 1121, an overlap determination unit 1122, an overlap removal unit 1123, and an integration unit 1124.

The coordinate system conversion unit 1121 converts coordinates of a plurality of detection points included in the sensor data stored in the acquired data storage unit 121 into values in an absolute coordinate system, thereby converting the sensor data into data allowing for calculation of relations between respective sensor data. The coordinate system conversion unit 1121 stores the converted sensor data in the coordinate conversion data storage unit 122.

The overlap determination unit 1122 determines overlapping portions between respective sensor data stored in the coordinate conversion data storage unit 122. The sensor data is data showing spatial features, like data acquired by a LiDAR sensor or data acquired by a MR terminal. The overlap determination unit 1122 calculates the presence of spatial overlaps between such sensor data. For example, of the sensor data stored in the coordinate conversion data storage unit 122, the overlap determination unit 1122 calculates, with respect to the latest sensor data which is the most temporally recent, the presence of spatial overlaps of sensor data other than the latest sensor data.

The overlap removal unit 1123 removes overlapping detection points, which are detection points in the sensor data other than the latest sensor data that the overlap determination unit 1122 has calculated to be spatially overlapping portions, from the detection points used in the relay data.

The integration unit 1124 integrates the remaining detection points of the sensor data not removed by the overlap removal unit 1123 to create one piece of integrated data that constitutes the relay data. The integration unit 1124 stores the created integrated data in the integrated data storage unit 123.

The upload unit 113 transmits the integrated data stored in the integrated data storage unit 123 as relay data to the central server SSV via the wired communication interface 13B. The upload unit 113 may include a data compression unit 1131 that compresses the integrated data using a three-dimensional data compression method such as Draco or the like to reduce the size to, for example, 30% of the original size. The upload unit 113 uploads the compressed data as relay data to the central server SSV.

In this way, the processing unit 11 receives sensor data from the sensor terminals ST via the wireless communication interface 13A, removes overlaps between each of the pieces of sensor data if any overlaps are present, and integrates the data into a single piece of data. Then, the processing unit 11 compresses the integrated data in a similar manner to the conventional art, and transmits the compressed data as relay data to the central server SSV. For example, raw data can be reduced by 70% by a data compression function of the sensor terminals ST, the total data size of three received pieces of sensor data can be reduced by 50% by the overlap removal and integration functions of the processing unit 11 of the relay server RSV, and the integrated data can be further reduced by 70% by the data compression function of the processing unit 11. In this case, traffic in the wired access network NW2 can be further reduced by 50% compared to when using the conventional art. Thus, by using the relay server RSV according to the present embodiment, spatial overlaps between collected pieces of data can be removed, and further traffic reduction is possible.

It should be noted that while the processing unit 11 of the relay server RSV of the present invention is realized by the processor 11A which is a computer and the program stored in the program memory 11B, this program may be provided to the relay server RSV by being recorded on a non-transitory computer-readable medium, or via a network. The program provided in this way may be stored in the program memory 11B. Alternatively, the provided program may be stored in the data memory 12 which is a storage, and may be executed by the processor 11A as necessary, whereby the processor 11A may function as the processing unit 11.

(Operation)

Figure 4:
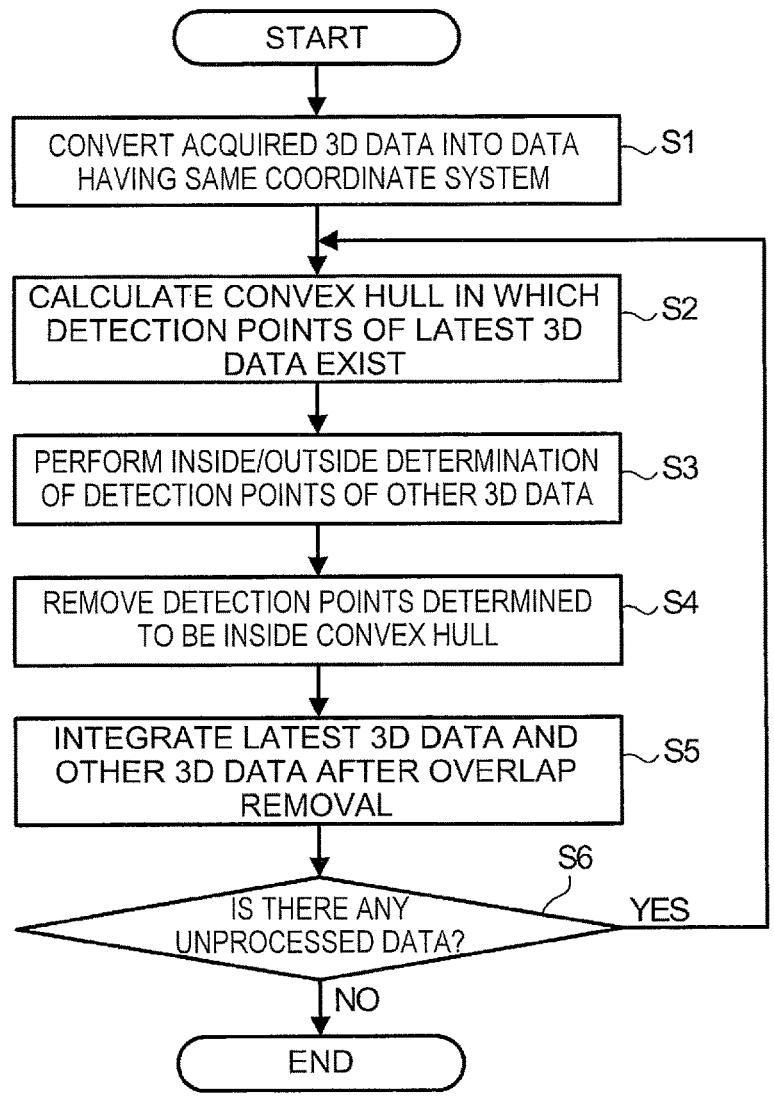
FIG. 4 is a flowchart showing an operation example of a relay data creation unit of the relay server according to one embodiment of the present invention.

Next, an information processing operation by the relay data creation unit 112 of the processing unit 11, which is the characteristic portion of the relay server RSV configured as described above, will be described. FIG. 4 is a flowchart showing the processing steps and processing contents thereof.

Here, it is supposed that communication between the sensor terminals ST and the relay server RSV has been established in advance via the wireless access network NW1. Similarly, it is supposed that communication between the relay server RSV and the central server SSV has been established in advance via the wired access network NW2. In addition, for the sake of simplicity, the number of sensor terminals ST and thus the number of pieces of sensor data in this description is two, but it goes without saying that this description similarly applies for three or more pieces of sensor data as well.

The relay data creation unit 112 may execute the process shown by the flowchart of FIG. 4 at certain time intervals. This certain time interval may be determined in advance based on the processing power of the processor 11A and the amount of sensor data to be processed.

The relay data creation unit 112 converts, by the coordinate system conversion unit 1121, each of a plurality of pieces of sensor data which are three-dimensional data stored in the acquired data storage unit 121 into data of the same coordinate system, and stores the resulting conversion data in the coordinate conversion data storage unit 122 (Step S1).

Figure 5:
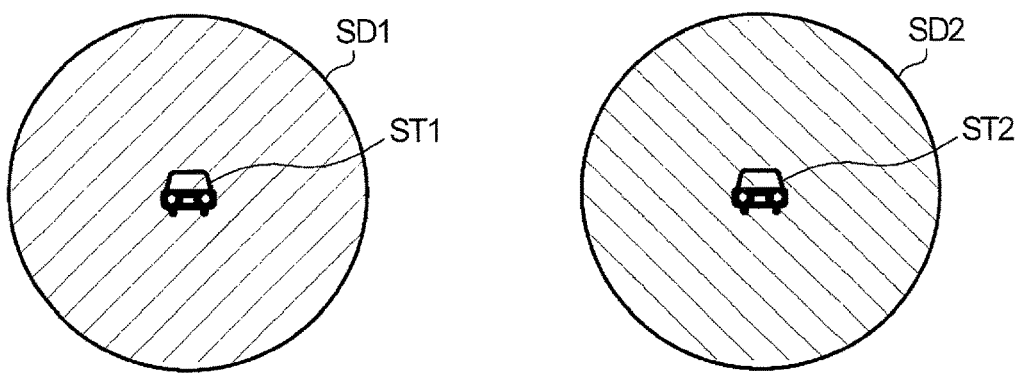
FIG. 5 is a schematic view representing, as two-dimensional circles, a bird's-eye view of sensor data respectively acquired by two sensor terminals.

For the sake of simplicity, in the following description, the number of pieces of sensor data is two. FIG. 5 is a schematic view showing a bird's-eye view of sensor data (LiDAR data) SD1 and SD2 respectively acquired by two sensor terminals ST1 and ST2, represented by two-dimensional circles. Each piece of sensor data SD1 and SD2 is represented as a two-dimensional circle for the sake of convenience, but has a three-dimensional spread. The sensor data SD1 has a unique three-dimensional coordinate system with the sensor terminal ST1 as the origin. Likewise, the sensor data SD2 has a unique three-dimensional coordinate system with the sensor terminal ST2 as the origin.

Figure 6:
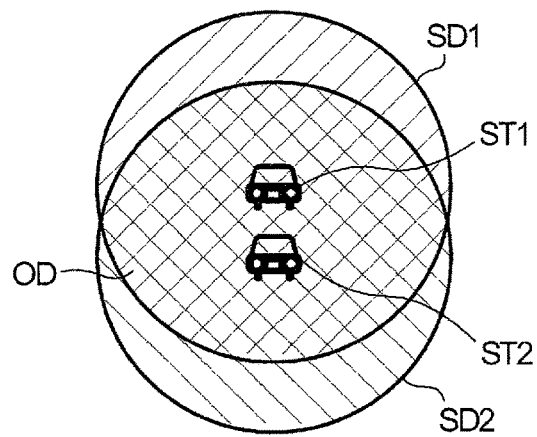
FIG. 6 is a schematic view showing an example of overlap removal and integration of sensor data from two geographically close sensor terminals.
Figure 6:
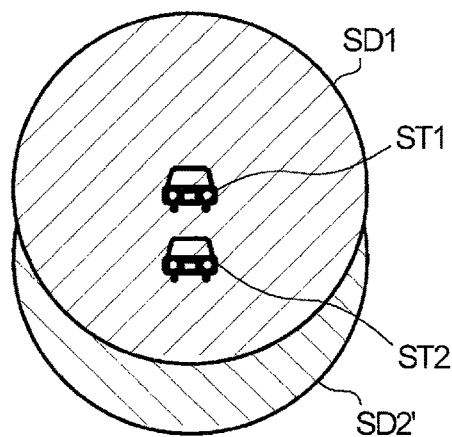
Figure 6:
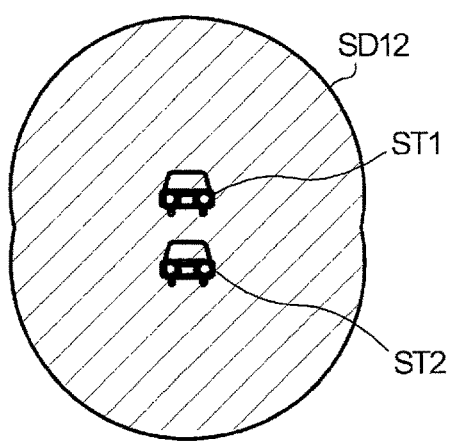

FIG. 6 is a schematic view showing an example of overlap removal and integration of sensor data of two geographically close sensor terminals. The top section of FIG. 6 shows an example of two pieces of sensor data overlapping, the middle section shows the two pieces of sensor data with overlaps removed, and the bottom section shows the sensor data integrated into one. As shown in the top section of FIG. 6, when the two sensor terminals ST1 and ST2 are in geographically close positions, the two sensor terminals ST1 and ST2 will sense the same objects, causing the majority of the sensor data SD1 and SD2 acquired by the respective sensor terminals ST1 and ST2 to overlap. As shown in the middle section of FIG. 6, of the three-dimensional data corresponding to this overlapping location (overlapping portion OD), the relay data creation unit 112 removes the data with an older acquisition time (sensor data SD2 in this drawing). This leaves only the sensor data SD2' as the sensor data of the sensor terminal ST2 to be integrated.

As mentioned above, the three-dimensional sensor data SD1 and SD2 acquired by the sensor terminals ST1 and ST2, which are MR terminals or LiDAR sensor or the like, have coordinates with the positions of the sensor terminals ST1 and ST2 as the origin. Therefore, the coordinate system is different for each piece of data, making it impossible to calculate spatial overlaps between pieces of data as is. To that end, before performing overlap removal, the relay data creation unit 112, at Step S1, converts the coordinates of the detection points included in each piece of sensor data into values in an absolute coordinate system, by the coordinate system conversion unit 1121. These values in the absolute coordinate system are, for example, anchor information in the case of a MR terminal (see, for example, "GitHub— microsoft/MixedRealityToolkit at c562ff9582cd10ea0448fd846f7b2bb261e8f551" [Online], [Retrieved on Jun. 24, 2019], Internet <URL: https://github.com/Microsoft/MixedRealityToolkit/tree/c562ff9582cd 10ea0448fd846f7b2bb261e8f551>), or latitude and longitude displayed by a GPS in the case of a connected car. By converting the coordinates of the detection points included in the data subject to overlap removal into the absolute coordinate system in this way, the three-dimensional sensor data SD1 and SD2 acquired by the different sensor terminals ST1 and ST2 can be plotted in the same space, allowing for calculation of spatial overlaps.

Figure 7A:
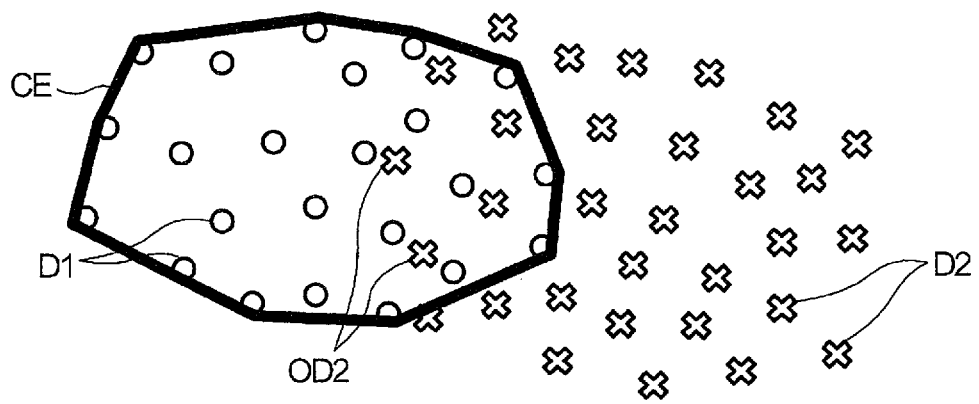
FIG. 7A is a schematic view showing an example calculation of overlaps using a convex hull with respect to sensor data from two sensor terminals.
Figure 7B:
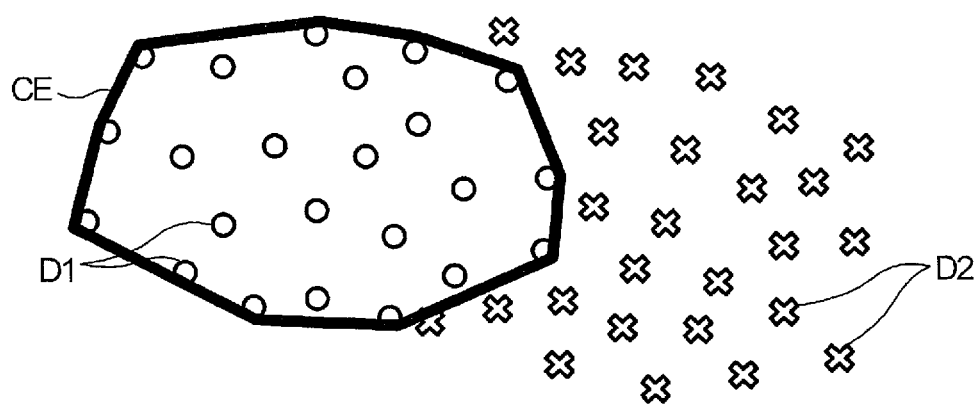
FIG. 7B is a schematic view showing an example of overlap removal of the sensor data corresponding to the example of FIG. 7A.

With respect to the two pieces of three-dimensional sensor data thus converted into the same coordinate system and stored in the coordinate conversion data storage unit 122, the relay data creation unit 112 calculates, by the overlap determination unit 1122, the overlapping location (overlapping portion OD). Then, as shown in the middle section of FIG. 6, of the three-dimensional data corresponding to this overlapping portion OD, the overlap removal unit 1123 removes the data with an older acquisition time (sensor data SD2 in the drawing). However, even if the sensor data SD1 and SD2 can be plotted in the same space, it is difficult to calculate spatial overlap using raw three-dimensional data. This is because three-dimensional data is basically merely an aggregate of detection points, and with raw data, the range of the three-dimensional space in which the detection points exist is unclear. Therefore, the relay data creation unit 112 calculates, by the overlap determination unit 1122, the spatial range in which the detection points exist, and calculates an overlap range using a determination of whether detection points included in other sensor data is inside or outside the range. Methods for calculating the spatial range in which detection points exist include approximation by a sphere with a radius r[m] centered on a certain point (the position of the sensor terminal, etc.), approximation by a smallest convex polyhedron (convex hull) including all given points, etc. With reference to FIG. 7A and FIG. 7B, an example of overlap removal using a convex hull and a determination of whether the detection points are inside or outside the convex hull will be described (for the sake of convenience, the drawing shows a case in two dimensions).

FIG. 7A is a schematic view showing an example calculation of overlaps using a convex hull with respect to sensor data SD1 and SD2 from the two sensor terminals ST1 and ST2, and FIG. 7B is a schematic view showing an example of overlap removal of the sensor data corresponding to the example of FIG. 7A. As shown in FIG. 7A, a convex hull CE is the smallest convex polygon (polyhedron in the case of three dimensions) that includes all given detection points. Therefore, the relay data creation unit 112 calculates, by the overlap determination unit 1122, the convex hull CE that includes all the detection points included in the latest sensor data, which is the latest three-dimensional sensor data (Step S2). This makes it possible to define a three-dimensional range in which the detection points included in the three-dimensional data exist. FIG. 7A shows an example in which the sensor data SD1 is the latest sensor data which is newer than the sensor data SD2, and a convex hull CE that includes all the detection points D1 of the sensor data SD1 is calculated. Since part of the detection points D2 (overlapping detection points OD2) of the sensor data SD2 which is sensor data other than the latest sensor data exist on the inside of the convex hull CE, it can be determined that the two pieces of sensor data SD1 and SD2 likely overlap each other at these overlapping detection points OD2. Therefore, the relay data creation unit 112 performs, by the overlap determination unit 1122, an inside/outside determination of the respective detection points of the three-dimensional data other than the latest three-dimensional data, which in this example are the detection points D2 of the sensor data SD2 (Step S3). This kind of convex hull process of the three-dimensional data and the associated inside/outside determination of detection points may be realized, for example, by the functions "convex hull", "Boolean", etc. included in "PyMesh", which is a Python library (see, for example, "PyMesh—Geometry Processing Library for Python— PyMesh 0.2.1 documentation" [Online], [Retrieved on Jun. 24, 2019], Internet <URL: https://pymesh.readthedocs.io/en/latest/index.html>).

Then, as shown in FIG. 7B, the relay data creation unit 112 removes, by the overlap removal unit 1123, the data of the overlapping detection points OD2 determined to be inside the convex hull CE (Step S4). As shown in the middle section of FIG. 6, of the sensor data SD2 of the sensor terminal ST2, which is old sensor data other than the latest sensor data, this leaves the sensor data SD2', which includes only the data of the detection points D2 with the overlapping detection points OD2 removed.

Figure 7C:
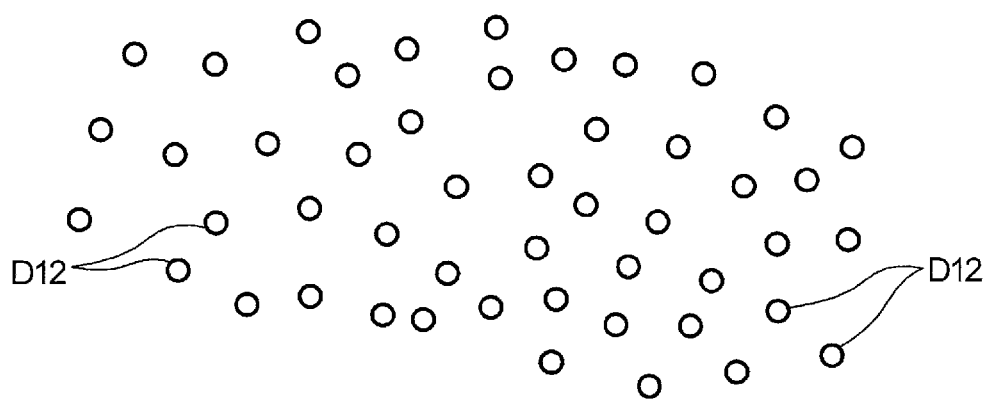
FIG. 7C is a schematic view showing an example of integration of the sensor data corresponding to the example of FIG. 7B.

Thereafter, the relay data creation unit 112 integrates, by the integration unit 1124, the latest three-dimensional data with the other respective three-dimensional data after overlap removal to create one piece of integrated data, and stores the integrated data in the integrated data storage unit 123 (Step S5). In other words, as shown in the bottom section of FIG. 6, the integration unit 1124 integrates a plurality of pieces of sensor data subject to the overlap removal calculation (sensor data SD1 and SD2' in this example) to create one piece of integrated data (integrated data SD12 in this example). An example of integration by this method will be described with reference to FIG. 7C. FIG. 7C is a schematic view showing an example of integration of the sensor data corresponding to the example of FIG. 7B. As shown, for example, in FIG. 7C, the integration unit 1124 may create the integrated data SD12 by employing the detection points D1 of the latest sensor data SD1 and the detection points D2 indicated by the sensor data SD2' remaining after the overlap removal as detection points D12 of the integrated data SD12.

With the integrated data created in this way, the relay data creation unit 112 determines whether or not there is any sensor data yet to be processed (Step S6). That is to say, there are cases in which three-dimensional data remains that has not been integrated because it does not overlap with the latest three-dimensional data. The relay data creation unit 112 therefore determines whether such three-dimensional data is present. If three-dimensional data yet to be processed exists, the process returns to Step S2 described above to perform overlap removal and integration of the unprocessed three-dimensional data with respect to the latest three-dimensional data.

Once all the three-dimensional data has been processed in this way, the relay data creation unit 112 ends the process shown in this flowchart.

(Effects)

As described above, in one embodiment of the present invention, when utilizing three-dimensional sensor data including information utilized in IoT via a network, the relay server RSV is arranged between the sensor terminals ST that acquire sensor data and the central server SSV that uses the data, and if the sensor data collected from the plurality of sensor terminals ST exhibits spatial features, spatial overlaps between the pieces of sensor data are removed on the communication path. As a result, when collecting large amounts of temporally close sensor data from a large number of sensor terminals, traffic during collection can be significantly reduced when collecting large amounts of sensor data acquired from nearby positions.

Further, since this function is performed by the relay server RSV, traffic can be reduced regardless of the data compression functionality on the sensor terminal ST side.

It should be noted that the traffic reduction rate according to one embodiment depends on the data size and the amount of data included in the overlapping portion. For example, in a case where there are two pieces of sensor data A and B of the same size, and 80% of the detection points included in the sensor data B are included in the sensor data A, traffic can be reduced by 40% compared to a case in which the sensor data A and B are transmitted to the central server SSV without overlap removal.

In addition, in one embodiment, it is possible to not only remove spatial overlaps between a plurality of pieces of sensor data, but also to integrate the plurality of pieces of sensor data with overlaps removed into one piece of sensor data. Since this allows for a reduction in the number of pieces of data collected via the wired access network NW2, network load can be further reduced. In addition, when performing processes such as object recognition at the central server SSV using the collected three-dimensional data as input, integrated data of N pieces of three-dimensional data can be used as the input, which makes it possible to finish the process faster than when processing N pieces of data separately.

In addition, in one embodiment, sensor data with mutually different coordinate systems are converted into data of an absolute coordinate system, which makes it possible to easily determine overlapping between the pieces of sensor data.

Further, in one embodiment, when uploading integrated relay data, data compression is performed to reduce the amount of data transmitted over the network. As a result, traffic flowing through the network can be further reduced.

In this way, according to one embodiment, in an IoT environment in which a diverse variety of information is acquired as vast amounts of sensor data, data that spatially overlapping is subjected to overlap removal and integration on the communication path, which allows for reduction of traffic flowing through the network. Since this makes it possible to prevent congestion in the network and effectively utilize the network, it is expected to create further value in the field of IoT.

Other Embodiments

It should be noted that the present invention is not limited to the above embodiment.

For example, use of the overlap removal method of the above embodiment is not limited to three-dimensional data. The convex hull (convex polyhedron) used in the above embodiment is known to be expandable to n dimensions. In addition, when approximating by a sphere with a radius r[m] as the range in which detection points exist, the Euclidian distance can be calculated in an n-dimensional space. It is thus possible to apply the technology described in the above embodiment as is to n-dimensional data, to determine and remove overlaps. In other words, the present invention can remove overlaps regardless of the number of dimensions of the sensor data.

It should be noted that while the above embodiment describes an example of overlap removal using detection points included in the sensor data, depending on the type of data generated by the sensor terminals, overlap removal of various spatial features may be performed, including not only points but also surfaces, etc.

In addition, the relay data creation unit 112 of the relay server RSV may be designed to perform overlap removal and integration of data not at certain time intervals, but at any timing, such as upon acquiring sensor data from a certain number of sensor terminals ST, upon acquiring a certain data amount of sensor data, etc.

Further, the relay data creation unit 112 may be designed so that the certain time interval, certain number, certain data amount, etc. is set in advance according to the type of acquired sensor data, or changed according to the type of acquired sensor data.

Moreover, the type of sensor terminal ST and sensing data, etc. may be modified in various ways without departing from the spirit and scope of the present invention.

Essentially, the present invention is not limited solely to the above embodiment, but may be realized with modifications to its constituent elements in the practical stage without departing from the spirit and scope of the invention. In addition, various types of inventions may be formed by suitable combinations of the plurality of constituent elements disclosed in the above embodiment. For example, some constituent elements of all the constituent elements shown in the embodiment may be omitted. Further, constituent elements spanning different embodiments may also be suitably combined.

REFERENCE SIGNS LIST

11 Processing unit
11A Hardware processor
11B Program memory
12 Data memory
13A Wireless communication interface
13B Wired communication interface
14 Bus
111 Data collection unit
112 Relay data creation unit
113 Upload unit
121 Acquired data storage unit
122 Coordinate conversion data storage unit
123 Integrated data storage unit
1111 Data decompression unit
1121 Coordinate system conversion unit
1122 Overlap determination unit
1123 Overlap removal unit
1124 Integration unit
1131 Data compression unit
D1, D2, D12 Detection point
NW1 Wireless access network
NW2 Wired access network
OD2 Overlapping detection point
RSV, RSV1, RSVm Relay server
SD1, SD2, SD2' Sensor data
SD12 Integrated data
SSV Central server
ST, ST1, ST3, STn Sensor terminal

The invention claimed is:

1. A relay server comprising: a hardware processor; and a memory connected to the hardware processor, the hardware processor configured to execute:
collecting sensor data from a plurality of mobile terminals, each mobile terminal of the plurality of mobile terminals comprising one or more sensors;
storing the sensor data in the memory as collected sensor data;
calculating a presence of spatial overlaps between the collected sensor data stored in the memory by identifying overlaps between most temporally recent sensor data from the collected sensor data included in a spatial range to other sensor data;
removing, in the memory, the identified overlaps between the collected sensor data stored;

creating relay data integrating the collected sensor data without the removed overlaps;
uploading the relay data to a central server via a network; and
wherein the hardware processor is configured to execute:
with respect to the most temporally recent sensor data of the collected sensor data calculating the spatial range in which detection points included in the most temporally recent sensor data exist; determining detection points of the sensor data other than the most temporally recent sensor data included in the spatial range as overlapping detection points; removing sensor data of the overlapping detection points from the sensor data including the overlapping detection points; and creating the relay data by integrating the most temporally recent sensor data and the sensor data from which the overlapping detection points were removed.

2. The relay server according to claim 1, wherein the hardware processor is configured to execute converting the collected sensor data, which have mutually different coordinate systems, into data of an absolute coordinate system.

3. The relay server according to claim 1, wherein the hardware processor is configured to execute performing data compression processing on the relay data.

4. The relay server according to claim 1, wherein the relay data represents a compressed version of the collected sensor data stored in the memory.

5. A relay method for a relay server that collects sensor data from a plurality of mobile terminals, each mobile terminal of the plurality of mobile terminals comprising one or more sensors, and uploads the sensor data to a central server via a network, the relay server comprising a hardware processor and a memory connected to the hardware processor, the relay method comprising:
collecting, by the relay server, the sensor data from the plurality of mobile terminals;
storing the sensor data in the memory as collected sensor data;
calculating, by the relay server, a presence of spatial overlaps between the collected sensor data stored in the memory by identifying overlaps between most temporally recent sensor data from the collected sensor data included in a spatial range to other sensor data;
removing, by the relay server in the memory, the identified overlaps between the collected sensor data;
creating, by the relay server, relay data integrating the collected sensor data without the removed overlaps;
and uploading, by the relay server, the relay data to the central server; and
with respect to the most temporally recent sensor data of the collected sensor data, calculating, by the relay server, the spatial range in which detection points included in the most temporally recent sensor data exist; determining, by the relay server, detection points of the sensor data other than the most temporally recent sensor data included in the spatial range as overlapping detection points: removing, by the relay server, sensor data of the overlapping detection points from the sensor data including the overlapping detection points; and creating, by the relay server, the relay data by integrating the most temporally recent sensor data and the sensor data from which the overlapping detection points were removed.

6. A non-transitory tangible computer readable storage medium having stored thereon a relay program for causing a hardware processor to execute:
collecting sensor data from a plurality of mobile terminals, each mobile terminal of the plurality of mobile terminals comprising one or more sensors;
storing the sensor data in a storage as collected sensor data;
calculating a presence of spatial overlaps between the collected sensor data stored in the memory by identifying overlaps between most temporally recent sensor data from the collected sensor data included in a spatial range to other sensor data;
removing, in the memory, the identified overlaps between the collected sensor data stored in the memory;
creating relay data integrating the collected sensor data without the removed overlaps; and
uploading the relay data to a central server via a network; and
with respect to the most temporally recent sensor data of the collected sensor data, calculating the spatial range in which detection points included in the most temporally recent sensor data exist: determining detection points of the sensor data other than the most temporally recent sensor data included in the spatial range as overlapping detection points: removing sensor data of the overlapping detection points from the sensor data including the overlapping detection points; and creating the relay data by integrating the most temporally recent sensor data and the sensor data from which the overlapping detection points were removed.

* * * * *